United States Patent
Shi et al.

(10) Patent No.: US 12,532,901 B2
(45) Date of Patent: Jan. 27, 2026

(54) COMPOSITIONS AND METHODS FOR TASTE MODULATION

(71) Applicant: Givaudan SA, Vernier (CH)

(72) Inventors: Feng Shi, Mason, OH (US); Moises Galano, Sao Paolo (BR); Laura H. Lucas, West Chester, OH (US); Yosuke Onuma, Cincinnati, OH (US); Matthew Steven Roach, Cincinnati, OH (US); Ioana Maria Ungureanu, Cincinnati, OH (US); Wei Yuan, Mason, OH (US)

(73) Assignee: GIVAUDAN SA, Vernier (CH)

( * ) Notice: Subject to any disclaimer, the term of this patent is extended or adjusted under 35 U.S.C. 154(b) by 315 days.

(21) Appl. No.: 18/039,679

(22) PCT Filed: Dec. 17, 2021

(86) PCT No.: PCT/EP2021/086594
§ 371 (c)(1),
(2) Date: May 31, 2023

(87) PCT Pub. No.: WO2022/129571
PCT Pub. Date: Jun. 23, 2022

(65) Prior Publication Data
US 2024/0114930 A1    Apr. 11, 2024

Related U.S. Application Data

(60) Provisional application No. 63/126,917, filed on Dec. 17, 2020.

(51) Int. Cl.
*A23L 27/00* (2016.01)
*A23L 2/60* (2006.01)
*A23L 27/10* (2016.01)
*A23L 27/30* (2016.01)

(52) U.S. Cl.
CPC ............... *A23L 2/60* (2013.01); *A23L 27/10* (2016.08); *A23L 27/36* (2016.08); *A23L 27/88* (2016.08)

(58) Field of Classification Search
CPC . A23L 2/60; A23L 27/88; A23L 27/10; A23L 27/36
See application file for complete search history.

(56) References Cited

U.S. PATENT DOCUMENTS

2018/0132516 A1* 5/2018 Ray .................. A23L 29/35

FOREIGN PATENT DOCUMENTS

CN    101062077 A    10/2007

OTHER PUBLICATIONS

Appleton, "Evaluating the bioavailability of isoquercetin". Available online as of Jan. 7, 2014 from https://www.naturalmedicinejournal.com, pp. 1-22. (Year: 2014).*
International Search Report for Application No. PCT/EP2021/086594, mailed on Apr. 20, 2022.
International Written Opinion for Application No. PCT/EP2021/086594, mailed on Apr. 20, 2022.
Ban Qingfeng, et al, "Physiochemical, rheological, microstructural, and antioxidant properties of yogurt using monk fruit extract as a sweetener", Journal of Dairy Science, American Dairy Science Association, Aug. 26, 2020, pp. 10006-10014, vol. 103, No. 11.
Gao Hao-Xiang, et al., "A potentially functional yogurt co-fermentation with Gnaphalium affine", LWT-Food Science and Technology, May 1, 2018, pp. 423-430, vol. 91, United Kingdom.
Souci S W, et al., "Yoghurt" In: "Food Composition and Nutrition tables", Jan. 1, 2016, pp. 56-57.
Goyal S. K., et al., "Stevia (*Stevia rebaudiana*) a bio-sweetener: a review", International Journal of Food Sciences and Nutrition, Feb. 1, 2010, pp. 1-10, vol. 61, No. 1.
Anonymous, "Isoquercitrin | C21H20012—PubChem", May 11, 2021, pp. 1-43. URL: https://web.archive.org/web/20210511053335/https://pubchem.ncbi.nlm.nih.gov/compound/5280804.

* cited by examiner

*Primary Examiner* — Jenna A Watts
(74) *Attorney, Agent, or Firm* — Curatolo Sidoti & Trillis Co., LPA; Floyd Trillis, III; Salvatore A. Sidoti

(57) ABSTRACT

A consumable is provided. The consumable includes (a) at least one sweetener, and (b) a sweetness modifier comprising an extract or fraction from *Gnaphalium affine* or at least one flavonoid compound. The at least one sweetener is present in a sweetening amount.

7 Claims, No Drawings

COMPOSITIONS AND METHODS FOR TASTE MODULATION

CROSS REFERENCE TO RELATED APPLICATIONS

This application is a national stage application of International Application No. PCT/EP2021/086594, filed 17 Dec. 2021, which claims priority from U.S. Provisional Patent Application No. 63/126,917, filed 17 Dec. 2020, both of which applications are incorporated herein by reference.

TECHNICAL FIELD

The present disclosure relates to compositions and methods, which use an extract or fraction from *Gnaphalium affine* and one or more flavonoid compounds isolated from *Gnaphalium affine*, in flavor compositions and consumables, for example to improve sweetness, improve mouthfeel and masking off-notes of consumables.

BACKGROUND

Compounds for modifying the taste of consumable products, that is, products taken orally either for ingestion or spitting out, such as foodstuffs, beverages, confectionery, oral care products and the like are widely used. They do not themselves add flavor to the consumable, but they provide desirable ancillary benefits, such as enhanced mouthfeel and/or sweetness or masking undesirable characteristics of other ingredients, such as the distinctive tastes and textures perceived as unappealing of products containing sugar replacers.

In the case of sugar replacers, the tastes they impart can present different temporal profiles, flavor-profiles or adaptation behaviors compared with the sugars which they replace, in whole or in part. For example, the sweet taste of natural and synthetic high-intensity sweeteners (HIS), is generally slower in onset and longer in duration than the sweet taste produced by sugar (sweet, short-chain, soluble carbohydrates, including glucose, fructose, sucrose, maltose and lactose) or high fructose corn syrups (HFCS) which is known as a replacement for sugar, and this can change the taste balance of an edible composition containing them. This can create unbalanced temporal taste profiles. In addition to the difference in temporal profile, high-intensity sweeteners generally exhibit lower maximal response than sugar; off-tastes including bitter, metallic, cooling, astringent, licorice-like taste and/or sweetness, which diminishes on iterative tasting.

However, all high-intensity sweeteners have undesirable after-taste in the form of off-notes, such as liquorice-like after-taste, and/or lingering sweetness. In the particular case of Reb A, this takes the form of a combination of an undesirable lingering sweetness and a liquorice-like after-taste. This after-taste detracts from the desired sugar-like sweetness and thus effectively masking undesirable tastes or off-tastes in edible compositions is key to consumer acceptance of many edible compositions.

Accordingly, there remains a need to provide taste modifying ingredients, extracts or fractions which are natural and/or suitable for vegans, i.e. "cleaner label", while at the same time improving mouthfeel, masking off-notes, and/or improving sweetness of consumables.

SUMMARY

In one illustrative embodiment, a consumable composition comprises (a) at least one sweetener, and (b) a sweetness modifier comprising an extract or fraction from *Gnaphalium affine* or at least one flavonoid compound. The at least one sweetener is present is a sweetening amount.

In another illustrative embodiment, a flavor composition comprises an extract or fraction from *Gnaphalium affine* or at least one flavonoid compound isolated from *Gnaphalium affine*.

In yet another illustrative embodiment, a method of enhancing the sweetness or mouthfeel of a consumable including a sweetener comprises adding an extract or fraction from *Gnaphalium affine* or at least one flavonoid compound to the consumable in an amount effective to enhance the sweetness or mouthfeel of the consumable.

In yet another illustrative embodiment, a flavor composition comprises a compound selected from the group consisting of spiraeoside, luteolin 4'-glucoside, isoquercetin and gnaphalin and combinations thereof.

These and other features, aspects and advantages of specific embodiments will become evident to those skilled in the art from a reading of the present disclosure.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present disclosure relates to the surprising finding that an extract or fraction from *Gnaphalium affine* (GA) and one or more flavonoid compounds isolated from the GA extract or fraction, exhibit a sweet modifying effect as well as mouthfeel modifying and masking properties. In particular, the present disclosure relates to the surprising finding that an extract or fraction from GA and one or more flavonoid compounds isolated from GA can be used, for example, to improve the temporal profile of reduced sugar or non-caloric sweeteners bringing them closer to a full sugar experience.

GA is an important Traditional Chinese herbal Medicine (TCM) used to treat hyperuricemia, asthma, rheumatic arthritis, antitussive, expectorant and cardiovascular in folk medicine because of anti-inflammatory and anti-oxidant activity.

All or part of the GA plant can be used in the present methods, in one embodiment, GA plant material is partially dried prior to extraction. In another embodiment, GA plant materially is totally dried prior to extraction. In some embodiments, the plant material is optionally milled prior to extraction.

The plant material may be extracted by any suitable extraction process, such as, for example, continuous or batch reflux extraction, supercritical fluid extraction, enzyme-assisted extraction, microorganism-assisted extraction, ultrasound-assisted extraction, microwave-assisted extraction, etc. The methods may be deployed at any scale.

The solvent used for the extraction can be any suitable solvent, such as for example, polar organic solvents (degassed, vacuumed, pressurized or distilled), non-polar organic solvents, water (degassed, vacuumed, pressurized, deionized, distilled, carbon-treated or reverse osmosis) or a mixture thereof. In a particular embodiment, the solvent comprises water and one or more alcohols. In a particular embodiment, the solvent comprises water and an alcohol selected from methanol, ethanol, n-propanol, 2-propanol, 1 butanol, 2-butanol and mixtures thereof.

The amount of alcohol in the solvent can vary from about 10% to about 100%, such as, for example, about 20%, about 30%, about 40%, about 50%, about 60%, about 70%, about 80%, about 90% or any range between. In a particular embodiment, alcohol comprises from about 80% to about 100% of the solvent, with the remainder being water.

In some embodiments, the extraction process takes place at elevated temperatures, such as, for example, from about 50° C. to about 100° C. In a more particular embodiment, the extraction process takes place at a temperature at about 100° C.

Those skilled in the art will understand that the duration of the extraction will vary based on the amount of solvent and plant material used. In some embodiments, the extraction is carried out for from about 10 minutes to about 24 hours. Water and/or any insoluble material can be removed from the extraction mixture to provide a "crude extract,"

Insoluble plant material may be separated from the extracted mixture by, e.g., filtration. Other suitable separation methods include, but are not limited to, gravity filtration, a plate-and-frame filter press, cross flow filters, screen filters, Nutsche filters, belt filters, ceramic filters, membrane filters, microfilters, nanofilters, ultrafilters or centrifugation. Optionally, various filtration aids such as diatomaceous earth, bentonite, zeolite etc., may be used in this process.

The crude extract is then subjected to one or more chromatographic separations to provide a solution of at least one flavanoid or flavin compound described herein. The crude extract is passed over one or more columns, e.g. those packed with polymeric adsorbent resins. Elution of the one or more columns with aqueous methanol provides a solution containing fractions of the plant extract. In one embodiment, 10% ethanol is first applied to the column and the eluent collected. Fractions can be collected based on % methanol used for elution. e.g., 0% methanol, 30% methanol, 50% methanol, 70% methanol and 100% methanol. Typically, the product of the chromatographic step is collected in multiple fractions, which may then be analyzed using any suitable technique, for example, thin layer chromatography or mass spectrometry.

According to the present disclosure, fractions of GA include flavonoids. Flavonoids are derived from flavans and have the general structure (C6-C3-C6) given below:

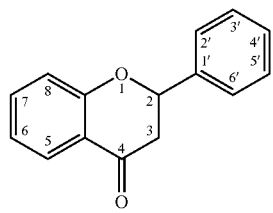

General Structural Formulae of Flavonoids

In one embodiment, flavonoid compounds according to the present disclosure are sweetness modifiers. The term "sweetness modifier", as used herein, refers to a compound that modifies, enhances, amplifies or potentiates the perception of sweetness of a consumable when the compound is present in the consumable in a concentration at or below the compound's sweetener recognition threshold, i.e. a concentration at which the compound does not contribute any noticeable sweet taste in the absence of the additional sweetener(s).

The term "sweetness recognition threshold concentration," as used herein, is the lowest known concentration of a compound that is perceivable by the human sense of taste as sweet.

In another embodiment, flavonoid compounds according to the present disclosure are taste modulators, with or without simultaneously acting as sweetness modifiers. That is, in some embodiments, the flavonoid compounds modify sweetness and modulate one or more taste attributes of a sweetener. In other embodiments, the flavonoid compounds modify the sweetness of a sweetener without modulating one or more taste attributes of the sweetener. In still other embodiments, the flavonoid compounds modulate one or more taste attributes of a sweetener without modifying the sweetness of the sweetener.

In one particular embodiment, flavonoid compounds according to the following formulas (I, II, III, IV, V, VI, and VII) are useful as a sweetness modifier and/or taste modifier:

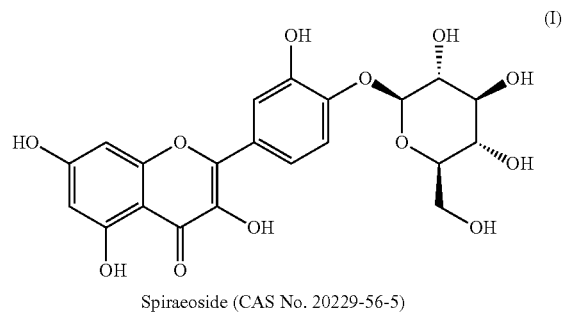

Spiraeoside (CAS No. 20229-56-5)

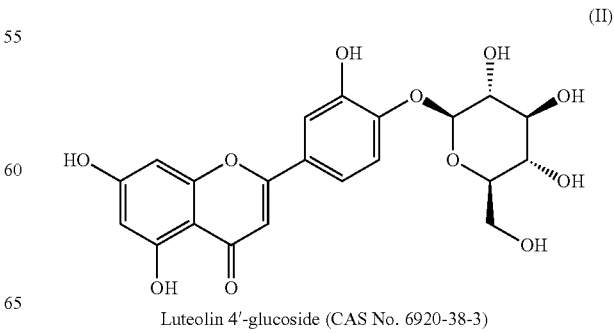

Luteolin 4'-glucoside (CAS No. 6920-38-3)

-continued

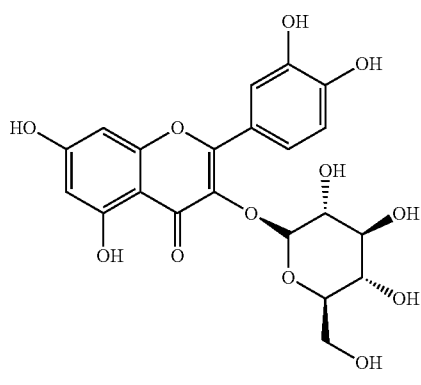

Isoquercetin (CAS No. 482-35-9) (III)

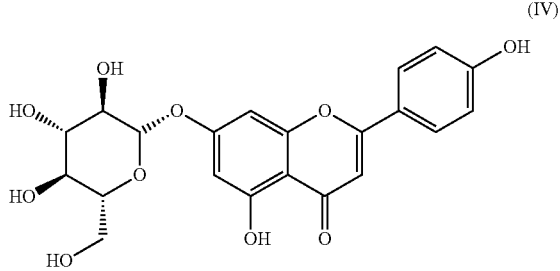

Apigenin 7-glucoside (CAS No. 578-74-5) (IV)

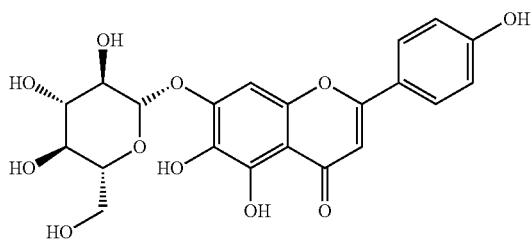

Scutellarein 7-O-β-D-glucoypyranoside (CAS No. 26046-94-6) (V)

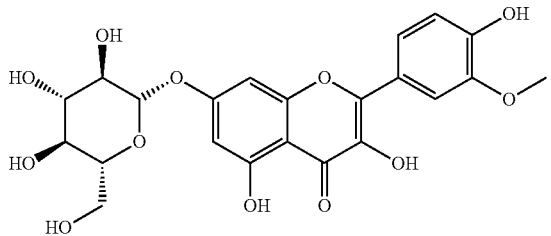

Isorhamnetin 7-glucoside (CAS No. 6743-96-0) (VI)

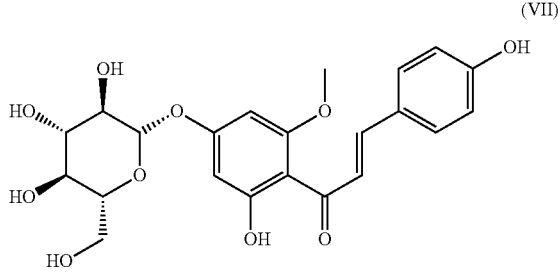

Gnaphalin (CAS No. 52077-36-8) (VII)

Thus, according to one embodiment, the at least one flavonoid may be selected from the group consisting of spiraeoside, luteolin 4'-glucoside, isoquercetin, apigenin-7-glucoside, scutellarein 7-O-β-D-glucopyranoside, isorhamnetin 7-glucoside, gnaphalin and combinations thereof.

The flavonoid compounds described herein can be provided in pure form or as part of a mixture. The mixture can be an extract or fraction prepared from the plant or portion of a plant, as described herein.

The extract or fraction from GA and/or the one or more flavonoid compounds described herein modify and/or modulate the taste of at least one sweetener. The at least one sweetener can be any known sweetener, for example, a natural sweetener, a natural high potency sweetener or a synthetic sweetener.

The at least one sweetener is present in a sweetening amount. "Sweetening amount", as used herein, refers to the amount of compound required to provide detectable sweetness when present in a consumable, e.g. a beverage.

As used herein, the phrase "natural high potency sweetener" refers to any sweetener found naturally in nature and characteristically has a sweetness potency greater than sucrose, fructose, or glucose, yea has less calories. The natural high potency sweetener can be provided as a pure compound or, alternatively, as part of an extract. As used herein, the phrase "synthetic sweetener" refers to any composition which is not found naturally in nature and characteristically has a sweetness potency greater than sucrose, fructose, or glucose, yet has less calories. In other embodiments, the at least one sweetener is a carbohydrate sweetener. Suitable carbohydrate sweeteners are selected from, but not limited to, the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheptulose, octolose, fucose, rhamnose, turanose, cellobiose, sialose and combinations thereof. In other embodiments, the at least one sweetener does not comprise a carbohydrate sweetener.

In another embodiment, the additional sweetener is a rare sugar selected from sorbose, lyxose, ribulose, xylose, xylulose, D-allose, L-ribose, D-tagatose, L-glucose, L-fucose, L-arabinose, turanose and combinations thereof. Other sweeteners include siamenoside I, monatin, and its salts (monatin SS, RR, RS, SR), curculin, glycyrrhizic acid and its salts, thaumatin, monellin, mabinlin, brazzein, tamatin, hemandulcin, phyllodulcin, glycyphyllin, trilobatin, baiyunoside, osladin, polypodoside A, pterocaryoside A, pterocaryoside B, mukurozioside, phlomisoside I, periandrin I, abrusoside A, steviolbioside and cyclocarioside I, sugar alcohols such as erythritol, sucralose, potassium acesulfame, acesulfame acid and salts thereof, aspartame, alitame, saccharin and salts thereof, hesperidin dihydrochalcone glucoside, neohesperidin, dihydrochalcone, cyclamate, cyclamic acid and salts thereof, neotame, advantame, glucosylated steviol glycosides (GSGs) and combinations thereof.

In one embodiment the sweetener is a caloric sweetener or mixture of caloric sweeteners. In another embodiment, the caloric sweetener is selected from sucrose, fructose, glucose, high fructose cornstarch syrup, a beet sugar, a cane sugar and combinations thereof.

In other embodiments, the sweetener comprises at least one steviol glycoside, wherein the at least one steviol glycoside is present in a sweetening amount. The steviol glycoside can be natural, synthetic or a combination of natural and synthetic. The steviol glycoside can be provided in pure form or as part of a mixture, i.e. a steviol glycoside blend. Exemplary steviol glycosides include, but are not limited to, rebaudioside M, rebaudioside D, rebaudioside A, rebaudioside N, rebaudioside O, rebaudioside E, steviolmonoside, steviolbioside, rubusoside, dulcoside B, dulcoside A, rebaudioside B, rebaudioside G, stevioside, rebaudioside C, rebaudioside F, rebaudioside I, rebaudioside H, rebaudioside L, rebaudioside K, rebaudioside rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glucosylated steviol glycosides and combinations thereof.

The steviol glycoside blend sweetener typically has a total steviol glycoside content of about 95% by weight or greater on a dry basis. The remaining 5% comprises other non-steviol glycoside compounds, e.g. by-products from extraction or purification processes. In some embodiments, the steviol glycoside blend sweetener has a total steviol glycoside content of about 96% or greater, about 97% or greater, about 98% or greater or about 99% or greater. "Total steviol glycoside content", as used herein, refers to the sum of the relative weight contributions of each steviol glycoside in a sample.

In one embodiment, the sweetener comprises at least one mogroside, wherein the at least one mogroside is present in a sweetening amount. The mogroside can be natural, synthetic or a, combination of natural and synthetic. The mogroside can be provided in pure form or as part of mixture, i.e. a mogroside blend. Exemplary mogrosides include, but are not limited to, any of grosmogroside I, mogroside IA, mogroside IE, 11-oxomogroside IA, mogroside II, mogroside II A, mogroside II B, mogroside II E, 7-oxomogroside II E, mogroside III, Mogroside Hie, 11-oxomogroside HIE, 11-deoxymogroside III, mogroside IV, Mogroside IVA 11-oxomogroside IV, 11-oxomogroside IV A, mogroside V, isomogroside V, 11-deoxymogroside V, 7-oxomogroside V, 11-oxomogroside V, isomogroside V, mogroside VI, mogrol, 11-oxomogrol, siamenoside I, and combinations thereof.

The weight ratio of the at least one sweetener to the at leak one flavonoid compound described herein can vary.

Products

According to the present disclosure, the extract or fraction from GA or the flavonoid compounds may be added to a sweetened consumable (i.e. a consumable having at least one sweetener therein), or may be provided as part of a flavor composition for consumables.

According to the present disclosure, flavor compositions may include a characterizing flavor and at least one flavonoid compound. The term "characterizing flavor" refers to a flavor that is perceived by an individual to be predominant upon consumption by the individual.

In one embodiment, the extract or fraction from GA or the flavonoid compounds described herein are present in the flavor composition in an amount such that, when the flavor composition is added to a sweetened consumable, the sucrose equivalence of the consumable is increased compared to the consumable in the absence of the extract or fraction from GA or flavonoid compound.

When added to a consumable, the extract or fraction from GA or flavonoid compounds are used in an amount effective to modify the sweetness or mouthfeel of a sweetener without exhibiting any off-taste. According to certain embodiments, the amount of the extract or fraction from GA or at least one flavonoid compound present in the consumable may be in a concentration of from about 0.01 ppm to about 100 ppm, in another embodiment from 0.01 ppm to about 50 ppm, such as, for example, from about 0.01 ppm to about 45 ppm, from about 0.01 ppm to about 40 ppm, from about 0.01 ppm to about 35 ppm, from about 0.01 ppm to about 30 ppm, from about 0.01 ppm to about 25 ppm, from about 0.01 ppm to about 20 ppm, from about 0.01 ppm to about 15 ppm, from about 0.01 ppm to about 10 ppm and from about 0.01 ppm to about 5 ppm.

In one embodiment, the at least one sweetener described herein is present in the consumable in a concentration from about 50 ppm to about 600 ppm, such as, for example, about 50 ppm to about 500 ppm, from about 50 ppm to about 400 ppm, from about 50 ppm to about 300 ppm, from about 50 ppm to about 300 ppm, from about 50 ppm to about 200 ppm, from about 50 ppm to about 100 ppm, about 100 ppm to about 600 ppm, about 100 ppm to about 500 ppm, about 100 ppm to about 400 ppm, about 100 ppm to about 300 ppm, about 100 ppm to about 200 ppm, about 200 ppm to about 600 ppm, about 200 ppm to about 500 ppm, about 200 ppm to about 400 ppm, about 200 ppm to about 300 ppm, about 300 ppm to about 600 ppm, about 300 ppm to about 500 ppm, about 300 ppm to about 400 ppm, about 400 ppm to about 600 ppm, about 400 ppm to about 500 ppm and about 500 ppm to about 600 ppm. In another embodiment, for full and reduced sugar applications, the at least one sweetener may be present in the consumable in a concentration up to 100,000 ppm.

When expressed as "ppm", the concentration is parts per million by weight based on the total weight of the consumable. It should be understood that when a range of values is described in the present disclosure, it is intended that any and every value within the range, including the end points, is to be considered as having been disclosed. For example, "a range of from 0.01 ppm to 100 ppm" of the extract or fraction from GA or flavonoid is to be read as indicating each and every possible number along the continuum between 0.01 and 100. It is to be understood that the inventors appreciate and understand that any and all values within the range are to be considered to have been specified, and that the inventors have possession of the entire range and all the values within the range.

Flavor compositions may also contain one or more food grade excipient(s). Suitable excipients for flavor compositions are well known in the art and include, for example, without limitation, solvents (including water, alcohol, ethanol, oils, fats, vegetable oil, and miglyol), binders, diluents, disintegranting agents, lubricants, flavoring agents, colouring agents, preservatives, antioxidants, emulsifiers, stabilisers, flavor-enhancers, sweetening agents, anti-caking agents, and the like. Examples of such carriers or diluents for flavors may be found e.g. in "Perfume and Flavour Materials of Natural Origin", S. Arctander, Ed., Elizabeth, N.J., 1960; in "Perfume and Flavor Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

The flavor composition may have any suitable form, for example liquid or solid, wet or dried, or in encapsulated form bound to or coated onto carriers/particles or as a powder. The flavor composition may include the characterizing flavor in an amount from about 0.01 to about 10%, in another embodiment from about 0.01 to about 5%, in yet another embodiment from about 0.01 to about 1%, or any individual number within the range, by weight of the flavor composition. In another embodiment, a consumable may include the characterizing flavor in an amount from about 0.001 to about 0.5%, in another embodiment from about 0.01 to about 0.3%, in yet another embodiment from about 0.02 to about 0.1%, or any individual number within the range, by weight of the consumable.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" of a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions or methods for each value, and determining the range of values that produce compositions or methods with the desired degree of effectiveness in accordance with the present disclosure.

The consumable may include a base. As used herein, the term "base" refers to all the ingredients necessary for the consumable, apart from the flavan and/or flavonone compound. These will naturally vary in both nature and proportion, depending on the nature and use of the consumable or additive, but they are all well known to the art and may be used in art-recognized proportions. The formulation of such a base for every conceivable purpose is therefore within the ordinary skill of the art.

Without limitation, and only by way of illustration, suitable bases may include, anti-caking agents, anti-foaming agents, anti-oxidants, binders, colourants, diluents, disintegrants, emulsifiers, encapsulating agents or formulations, enzymes, fats, flavor-enhancers, flavoring agents, gums, polysaccharides, preservatives, proteins, solubilisers, solvents, stabilisers, sugar-derivatives, surfactants, sweetening agents, vitamins, waxes, and the like. Solvents which may be used are known to those skilled in the art and include e.g. water, ethanol, ethylene glycol, propylene glycol, glycerine and triacetin. Encapsulants and gums include maltodextrin, gum arabic, alginates, gelatine, modified starch, other polysaccharides, and proteins.

Examples of excipients, carriers, diluents or solvents for flavor compounds may be found e.g. in "Perfume and Flavour Materials of Natural Origin", S. Arctander, Ed., Elizabeth, N.J., 1960; in "Perfume and Flavour Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

Non-limiting examples of suitable flavor-providing ingredients include natural flavors, artificial flavors, spices, seasonings, and the like. These include synthetic flavor oils and flavoring aromatics and/or oils, oleoresins, essences, and distillates, and combinations thereof.

Ancillary ingredients may be present to provide other benefits such as enhanced stability, ease of incorporation into a consumable or additive and enhanced nutritional value. Non-limiting typical examples of such ancillary ingredients include stabilizers, emulsifiers, preservatives, gums, starches, dextrins, vitamins and minerals, functional ingredients, salts, antioxidants, and polyunsaturated fatty acids. Particular examples are emulsifiers and carriers, useful in spray drying processes. Non-limiting examples of these are modified starches, such as Capsul™, and maltodextrin.

The additive may be a single ingredient or a blend of ingredients, or it may be encapsulated in any suitable encapsulant. The additive may be prepared by any suitable method, such as spray drying, extrusion and fluidized bed drying.

According to the present disclosure, the term "consumable" refers to products for consumption by a subject, typically via the oral cavity (although consumption may occur via non-oral means such as inhalation), for at least one of the purposes of enjoyment, nourishment, or health and wellness benefits. Consumables may be present in any form including, but not limited to, liquids, solids, semi-solids, tablets, capsules, lozenges, strips, powders, gels, gums, pastes, slurries, solutions, suspensions, syrups, aerosols and sprays. The term also refers to, for example, dietary and nutritional, and health and wellness supplements. Consumables include compositions that are placed within the oral cavity for a period of time before being discarded but not swallowed. It may be placed in the mouth before being consumed, or it may be held in the mouth for a period of time before being discarded.

Broadly, consumables include, but are not limited to, comestibles of all kinds, confectionery products, baked products, sweet products, savoury products, fermented products, dairy products, non-dairy products, beverages, nutraceuticals and pharmaceuticals.

Non-limiting examples of consumables include: wet/liquid soups regardless of concentration or container, including frozen soups. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage), soup may be used as an ingredient for preparing other meal components and may range from broths (consomme) to sauces (cream or cheese-based soups); dehydrated and culinary foods, including cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen; beverages, including beverage mixes and concentrates, including but not limited to, alcoholic and non-alcoholic ready to drink and dry powdered beverages, carbonated and non-carbonated beverages, e.g., sodas, fruit or vegetable juices, alcoholic and non-alcoholic beverages, teas such as green tea and black tea, wine such as red wine; confectionery products, e.g., cakes, cookies, pies, candies, chewing gums, gelatins, ice creams, sorbets, puddings, jams, jellies, salad dressings, and other condiments, cereal, and other breakfast foods, canned fruits and fruit sauces and the like.

Methods of enhancing the sweetness of a consumable and/or modulating one or more taste attributes of the sweetener to make the consumable taste more like a sucrose-sweetened consumable are provided.

In one embodiment, a method of enhancing the sweetness of a consumable comprises (i) providing a consumable comprising at least one sweetener and (ii) adding an extract or fraction from GA or at least one flavonoid compound to the consumable to provide a consumable with enhanced sweetness.

In another embodiment, a method of enhancing the sweetness of a consumable comprises (i) providing a consumable base and (ii) adding at least one sweetener and an extract or fraction from GA or at least one flavonoid compound to the consumable base to provide a consumable with enhanced sweetness. The at least one sweetener and the extract or fraction from GA or at least one flavonoid compound can be added together in the form of a flavor, or separately.

The disclosure is further described with reference to the following non-limiting examples.

EXAMPLES

The following examples are given solely for the purpose of illustration and are not to be construed as limitations of the present invention, as many variations of the invention are possible without departing from the spirit and scope of the present disclosure.

Example 1: Preparation of *Gnaphalium affine* Extract and Fractions

*Gnaphalium affine* powder (200 g) was loaded onto 66 mL stainless cell (2 or 3 cells depending on the material density). The condition settings of Dionex™ ASE™ 350 Accelerated Solvent Extractor (ASE) are: pressure 1500 psi; temperature 100° C.; static time 15 min; cycle 2; rinse 70%; purge 60 s. Each cell was extracted by 100% and 80% methanol sequentially. All the extracts were combined and the organic solvents were evaporated on rotary evaporator to afford 42 g extracts. The extracts after rotary evaporator were freeze-dried.

The *Gnaphalium affine* extract was then subjected for HP-20 fractionation. Briefly, 10 g *Gnaphalium affine* extract was suspended in water and sonicated for 20 min. The suspension was then loaded onto a pre-equilibrated HP-20 column. The HP-20 column was eluted with gradient mobile phase (0%, 30%, 50%, 70%, 100% methanol in water, 4 mL/min) on a Biotage flash chromatography system. UV signal was set at 254 nm to monitor fractionation efficiency. Five fractions (0, 30%, 50%, 70% 100% MeOH fractions) were obtained. The fractions were evaporated under reduced vacuum to remove organic solvent and further lyophilized to dryness.

Example 2: Isolation and Characterization of Fractions from *Gnaphalium affine*

The chemical profiling was performed on Waters ACQUITY H-Class UPLC-Synapt G2-Si system (Waters, USA). A UPLC C18 analytical column (2.1 mm×150 mm, I.D., 1.8 µm, ACQUITY UPLC® HSS T3, Waters, USA) was used at 25° C. Water (a) and Acetonitrile (B) (both containing 0.1% formic acid) were used as mobile phase, and linear gradient was programmed as follows: 0-30 min, 5% B; 30-45 min, 90% B; 45-46 min, B %; 46-50 min, 5% B. The flow rate was set 0.8 mL·min$^{-1}$ and the injection volume was 2 µL. The mass spectrometer was equipped with electrospray ionization (ESI) source, and data were acquired in positive mode by scanning from m/z 100 to 1500. The MS analysis was operated as follows: desolvation gas flow rate, 800 L/hr; desolvation temperature 300° C.; nebulizer gas flow, 6.5 Bar; capillary voltage, 3000 V; source temperature, 80° C.; Sampling cone, 40 V. Scan time was set to 0.2 s. Internal calibration was performed through the lockspray interface by infusing a 400 ng/ml solution of Leucine-enkephalin in the mass spectrometer at a flow rate of 10111/min. The lockspray scan time and frequency were set at 0.5 s and 15 s, respectively. The system was controlled by Masslynx 4.1 (Waters). Data was acquired in the MS E mode over the m/z range 50-1500 using alternating scans of 0.2 s at low (10 ev) and high (20-120 ev ramp) collision energies without precursor selection.

TABLE I

Characterization of Compounds in a Fraction from *Gnaphalium affine*

| Peak | $t_R$ (min) | Formula | Detected m/z [M + H]$^+$ | Theoretical m/z [M + H]$^+$ | Identification |
|---|---|---|---|---|---|
| 1 | 12.52 | C18H28O17 | 517.1390 | 517.1405 | Isochlorogenic acid A |
| 2 | 13.27 | C18H28O17 | 517.1390 | 517.1405 | Isochlorogenic acid B |
| 3 | 13.02 | C21H20O11 | 449.1084 | 449.1084 | Luteolin 4'-glucoside |
| 4 | 12.99 | C21H20O12 | 465.1043 | 465.1033 | Spiraeoside |
| 5 | 12.96 | C21H20O10 | 433.1146 | 433.1135 | Apigenin-7-glucoside |
| 6 | 11.47 | C21H20O12 | 465.1014 | 465.1033 | isoquercetin |
| 7 | 11.16 | C21H18O13 | 479.0816 | 479.0826 | Isorhamnetin 7-glucoside |
| 8 | 11.84 | C21H20O11 | 449.1084 | 449.1084 | Scutellarein7-O-β-D-glucopyranoside |
| 9 | 15.47 | C22H24O10 | 449.1442 | 449.1448 | Gnaphalin |

Example 3: Taste Modulation Using *Gnaphalium affine* Fraction

A water and methanol fraction (HP-20 50% methanol fraction) of *Gnaphalium affine* was prepared and descriptive sensory evaluations were carried out using different amounts of the extract in different applications. The results of this analysis, as compared to the same applications in the absence of the *Gnaphalium affine* fraction, are presented in Table II.

TABLE II

| Application | Fraction (50%) | Taste Evaluation |
|---|---|---|
| Still Neutral Reduced Sugar beverage (21.6% sugar syrup, 0.3% sodium benzoate, 0.4% citric acid, 17.87% water, 0.2% sweetness flavor | 5 ppm | Trend toward an effect of higher overall sweetness and higher body sweet |
| Still Neutral Reduced Sugar beverage (21.6% sugar syrup, 0.3% sodium benzoate, 0.4% citric acid, 17.87% water, 0.2% sweetness flavor | 1 ppm | More mouthfeel, more upfront sweetness, more syrupy, sweet brown, more long lasting, slight fruity sweet |
| Base: RebA 250 ppm and 0.03% citric acid | 1 ppm | Increased sweet, increase mouthfeel, slightly earth aftertaste |
| Base: 7% sucrose, 0.01% sodium citrate, 0.05% potassium sorbate, 0.5% citric acid, 0.06% lemon-lime flavor | 0.8 ppm | Sweeter, better sweet quality, more lemon |
| Base: 9% sucrose, 0.01% sodium citrate, 0.05% potassium sorbate, 0.3% citric acid, 0.06% lemon-lime flavor | 0.8 ppm | Well balanced, full body, some dryness |
| Base: 9% sucrose, 0.01% sodium citrate, 0.05% potassium sorbate, 0.3% citric acid, 0.06% lemon-lime flavor | 4 ppm | Great mouthfeel, less bitter astringent, no offnote, some dryness, little more bitter |
| Base: 9% sucrose, 0.01% sodium citrate, 0.05% potassium sorbate, 0.3% citric acid, 0.06% lemon-lime flavor | 8 ppm | Similar to 4 ppm, not better |

Example 4: Taste Modulation Using Compounds Isolated from *Gnaphalium affine* Extract Descriptive sensory evaluations were carried out using different amounts of compounds isolated from *Gnaphalium affine* fractions in different bases. The results of this analysis, as compared to the same bases in the absence of the compounds, are presented in Table III.

TABLE III

| Base | Compound | Taste Evaluation |
|---|---|---|
| Base: 20% Syrup base (11.2% Sugar syrup 65Bx, 0.015% Sodium Benzoate, 0.05% Citric acid, 0.1% Sweetness flavor) | 0.5 ppm of I | More mouthfeel. Similar sweetness, burning-bitter, reduce juiciness, slightly pungent, dry at end. Less linger, astringent, slightly bitter. |
| Base: 20% Syrup base (11.2% Sugar syrup 65Bx, 0.015% Sodium Benzoate, 0.05% Citric acid, 0.1% Sweetness flavor) | 1 ppm of II | More mouthfeel, sweeter. Slight improved mouth-round, slightly increased linger, add astringency, dryness at end. More astringent, mouth dry effect. Very bitter, slightly sweeter. |
| Base: 5% Sucrose, 0.1% Citric acid, 0.011% Sucralose, 0.004% AceK + 0.1% Lemon Lime flavor | 0.5 ppm of VIII | Reduce lingering sweet, clean, less sweet, more sour |
| Still Neutral Reduced Sugar beverage (21.6% sugar syrup, 0.3% sodium benzoate, 0.4% citric acid, 17.87% water, 0.2% sweetness flavor | 5 ppm of III | Reduce acidity, increase mouthfeel, no bitterness, cut lingering, slightly dry |

Compounds of Table III demonstrate a positive overall contribution to sweet modulation effects.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumable comprising,
   (a) at least one sweetener, and
   (b) an extract or fraction from *Gnaphalium affine*, wherein the at least one sweetener is present in a sweetening amount, and wherein the extract or fraction from *Gnaphalium affine* is present in a concentration of from 0.01 ppm to 100 ppm.

2. The consumable of claim 1, wherein the at least one sweetener is selected from the group consisting of sucrose, fructose, glucose, xylose, arabinose, rhamnose, tagatose, allulose, trehalose, isomaltulose, steviol glycosides, mogrosides, stevia, trilobatin, rubusoside, aspartame, advantame, agave syrup, acesulfame potassium (AceK), high fructose corn syrup, neotame, saccharin, sucralose, high fructose corn syrup, starch syrup, Luo Han Guo extract, neohespiridin dihydrochalcone, naringin dihydrochalcone, HDG, sugar alcohols cellobiose, psicose, cyclamate, brazzein, thaumatin, molasses, rice syrup and combinations thereof.

3. The consumable of claim 2, wherein the steviol glycosides are selected from the group consisting of rebaudioside M, rebaudioside D, rebaudioside A, rebaudioside N, rebaudioside O, rebaudioside E, steviolmonoside, steviolbioside, rubusoside, dulcoside B, dulcoside A, rebaudioside B, rebaudioside G, stevioside, rebaudioside C, rebaudioside F, rebaudioside I, rebaudioside H, rebaudioside L, rebaudioside K, rebaudioside J, rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glucosylated steviol glycosides and combinations thereof.

4. The consumable of claim 2, wherein the mogrosides are selected from the group consisting of grosmogroside I, mogroside IA, mogroside IE, 1 1-oxomogroside IA, mogroside II, mogroside II A, mogroside II B, mogroside II E, 7-oxomogroside II E, mogroside III, Mogroside HIE, 1 1-oxomogroside HIE, 1 1-deoxymogroside III, mogroside IV, Mogroside IVA 1 1-oxomogroside IV, 1 1-oxomogroside IV A, mogroside V, isomogroside V, 1 1-deoxymogroside V, 7-oxomogroside V, 11-oxomogroside V, isomogroside V, mogroside VI, mogrol, 1 1-oxomogrol, siamenoside I, and combinations thereof.

5. The consumable of claim 1, wherein the extract or fraction from *Gnaphalium affine* comprises spiraeoside, luteolin 4'-glucoside, isoquercetin, apigenin-7-glucoside, scutellarein 7-O-β-D-glucopyranoside, isorhamnetin 7-glucoside and gnaphalin.

6. The consumable of claim 1, wherein the consumable is a beverage.

7. A method of enhancing the sweetness or mouthfeel of a consumable including a sweetener comprising adding an extract or fraction from *Gnaphalium affine* to the consumable in a concentration of from 0.01 ppm to 100 ppm.

* * * * *